US012761324B2

(12) United States Patent
Hirano et al.

(10) Patent No.: US 12,761,324 B2
(45) Date of Patent: Oct. 13, 2026

(54) NEAR-INFRARED TRANSMISSIVE COVERS AND NEAR-INFRARED SENSOR

(71) Applicant: TOYODA GOSEI CO., LTD., Kiyosu (JP)

(72) Inventors: Risa Hirano, Kiyosu (JP); Koji Fukagawa, Kiyosu (JP); Koichi Miyake, Kiyosu (JP); Hyogo Urazumi, Kanagawa-ken (JP); Akira Kawaguchi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 425 days.

(21) Appl. No.: 18/443,639

(22) Filed: Feb. 16, 2024

(65) Prior Publication Data

US 2024/0295634 A1 Sep. 5, 2024

(30) Foreign Application Priority Data

Mar. 1, 2023 (JP) ................................ 2023-030809

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01)

(58) Field of Classification Search
CPC ....... G01S 17/931; G01S 7/481; G01S 7/4813
See application file for complete search history.

(56) References Cited

U.S. PATENT DOCUMENTS

2020/0124701 A1 4/2020 Takahashi et al.
2020/0363329 A1* 11/2020 Okumura ............ G01N 21/359
2021/0096030 A1* 4/2021 Okumura ............ G01J 5/0853
(Continued)

FOREIGN PATENT DOCUMENTS

JP 2020-067291 A 4/2020
JP 2020067514 A 4/2020
(Continued)

OTHER PUBLICATIONS

Office Action dated Jun. 2, 2026, issued in corresponding Japanese Patent Application No. 2023-030809 (and English machine translation).

(Continued)

*Primary Examiner* — Md N Haque
(74) *Attorney, Agent, or Firm* — Posz Law Group, PLC

(57) ABSTRACT

A near-infrared transmissive cover is configured to cover an emitting unit and a receiving unit that are included in a near-infrared sensor from the front in an emission direction of near-infrared rays. The near-infrared transmissive cover includes a cover body. A framework of the cover body includes a base including a plate-shaped base body. The cover body includes the base body, a decorative layer that protrudes from the base body, a coating layer that is placed on the base body while covering the decorative layer, and a reflection suppression portion located at a rearmost part in the emission direction of the cover body. The decorative layer is formed by a part of the base or a member different from the base. The decorative layer and the coating layer are respectively made of plastic materials having a difference in refractive index of less than or equal to 0.03.

6 Claims, 9 Drawing Sheets

(56) References Cited

U.S. PATENT DOCUMENTS

| | | | | |
|---|---|---|---|---|
| 2021/0148761 | A1* | 5/2021 | Okumura | G01J 1/0228 |
| 2022/0196843 | A1* | 6/2022 | Li | G01S 17/931 |
| 2023/0104850 | A1 | 4/2023 | Furukawa et al. | |
| 2023/0291089 | A1 | 9/2023 | Kobayashi et al. | |

FOREIGN PATENT DOCUMENTS

| | | | |
|---|---|---|---|
| JP | 6904392 | B2 | 7/2021 |
| JP | 2022-027639 | A | 2/2022 |
| JP | 2022-029168 | A | 2/2022 |

OTHER PUBLICATIONS

Office Action dated Dec. 16, 2025 issued in corresponding Japanese patent application No. 2023-030809 (and English translation).

* cited by examiner

NEAR-INFRARED TRANSMISSIVE COVERS AND NEAR-INFRARED SENSOR

BACKGROUND

1. Field

The present disclosure relates to a near-infrared transmissive cover and a near-infrared sensor.

2. Description of Related Art

For example, Japanese Laid-Open Patent Publication No. 2020-67291 discloses a sensor module that includes a near-infrared sensor and a near-infrared transmissive cover and is installed in a land vehicle.

The near-infrared sensor includes an emitting unit that emits near-infrared rays and a receiving unit that receives near-infrared rays. The near-infrared transmissive cover includes a cover body having transmissiveness to near-infrared rays. The cover body covers the emitting unit and the receiving unit from the front in the emission direction of the near-infrared rays.

In the above-described sensor module, the emitting unit emits near-infrared rays to the outside of the land vehicle. The emitted near-infrared rays pass through the cover body. After striking and being reflected by an object outside the vehicle, the near-infrared rays pass through the cover body and are received by the receiving unit. Based on the emitted near-infrared rays and the received near-infrared rays, the near-infrared sensor recognizes the object outside the land vehicle, and detects the distance between the land vehicle and the object, the relative velocity, and the like.

A framework of the cover body includes a base including a plate-shaped base body.

FIGS. 18 and 19 show examples of cover bodies from related art. FIG. 18 shows a cover body 81 that includes a base body 82 and a decorative layer 84. The base body 82 includes a rear surface 83 in the emission direction that is formed by a smooth surface. The decorative layer 84 is formed on the rear side in the emission direction of the base body 82. The decorative layer 84 is formed, for example, by applying paint to the entire rear surface 83 of the base body 82.

FIG. 19 shows a cover body 91 that includes a base body 92, a decorative layer 94, and a coating layer 95. The base body 92 includes a front surface 93 in the emission direction that is formed by a smooth surface. The decorative layer 94 protrudes forward in the emission direction from the base body 92. The coating layer 95 covers the decorative layer 94. The decorative layer 94 is formed, for example, by applying paint to a part of the front surface 93 of the base body 92. The coating layer 95 is, for example, molded with a plastic to be laminated onto the base body 92 while covering the decorative layer 94.

In the cover body 81 shown in FIG. 18, the base body 82 and the decorative layer 84 are adjacent to each other with their respective smooth surfaces contacting each other. In a region of the cover body 81 through which near-infrared rays IR pass, a portion (step) inclined with respect to the base body 82 is unlikely to form. Thus, the near-infrared rays IR emitted from the emitting unit of the near-infrared sensor are not easily refracted and readily pass through the cover body 81 in a straight line.

In contrast, the cover body 91 shown in FIG. 19 includes a portion (step) inclined with respect to the base body 92 at the boundary between a peripheral portion 94P of the decorative layer 94 and a portion of the coating layer 95 that covers the peripheral portion 94P. Depending on the combination of the material of the decorative layer 94 and the material of the coating layer 95, the near-infrared rays IR may be significantly refracted when passing through the step. In this case, when detecting an object outside the land vehicle, the near-infrared sensor may unable to accurately detect the position of the object at sections where the near-infrared rays IR are refracted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a near-infrared transmissive cover is configured to cover an emitting unit and a receiving unit that are included in a near-infrared sensor from a front in an emission direction. The emitting unit is configured to transmit near-infrared rays to an outside of a vehicle while changing the emission direction within a predetermined angular range. The receiving unit is configured to receive the near-infrared rays that have struck and been reflected by an object of the outside. The near-infrared transmissive cover includes a cover body having transmissiveness to the near-infrared rays. A framework of the cover body includes a base including a plate-shaped base body. The cover body includes the base body, a decorative layer that protrudes forward or rearward in the emission direction from the base body, a coating layer that is laminated onto the base body so as to cover the decorative layer, and a reflection suppression portion located at a rearmost part in the emission direction of the cover body. The reflection suppression portion suppresses reflection of the near-infrared rays emitted from the emitting unit. The decorative layer is formed by a part of the base or a member different from the base. The decorative layer and the coating layer are respectively made of plastic materials having a difference in refractive index of less than or equal to 0.03.

In another general aspect, a near-infrared sensor includes an emitting unit that is configured to transmit near-infrared rays to an outside of a vehicle while changing an emission direction within a predetermined angular range, a receiving unit that is configured to receive the near-infrared rays that have struck and been reflected by an object of the outside, a case including an open front end in the emission direction and that incorporates the emitting unit and the receiving unit, and a near-infrared transmissive cover that covers the emitting unit and the receiving unit from a front in the emission direction. The near-infrared transmissive cover includes a peripheral wall that is arranged in front of the case in the emission direction and has an annular cross-sectional shape, and a cover body that is formed at a front end of the peripheral wall in the emission direction and has transmissiveness to the near-infrared rays. A framework of the cover body includes a base including a plate-shaped base body. The cover body includes the base body, a decorative layer that protrudes forward or rearward in the emission direction from the base body, a coating layer that is laminated onto the base body so as to cover the decorative layer, and a reflection suppression portion located at a rearmost part in the emission direction of the cover body. The reflection suppression portion suppresses reflection of the near-infrared rays emitted from the emitting unit. The decorative layer is formed by a part of the base or a member different from the base. The decorative layer and the coating layer are respectively made of plastic materials having a difference in refractive index of less than or equal to 0.03.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A sensor module 11 for a land vehicle 10 according to a first embodiment of the present disclosure will now be described with reference to FIGS. 1 to 3.

In the following description, the direction in which the land vehicle 10 advances forward will be referred to as the front, and the reverse direction will be referred to as the rear. The vertical direction refers to the vertical direction of the land vehicle 10, and the left-right direction refers to the vehicle width direction that matches with the left-right direction when the land vehicle 10 is advancing forward.

Figure 2:
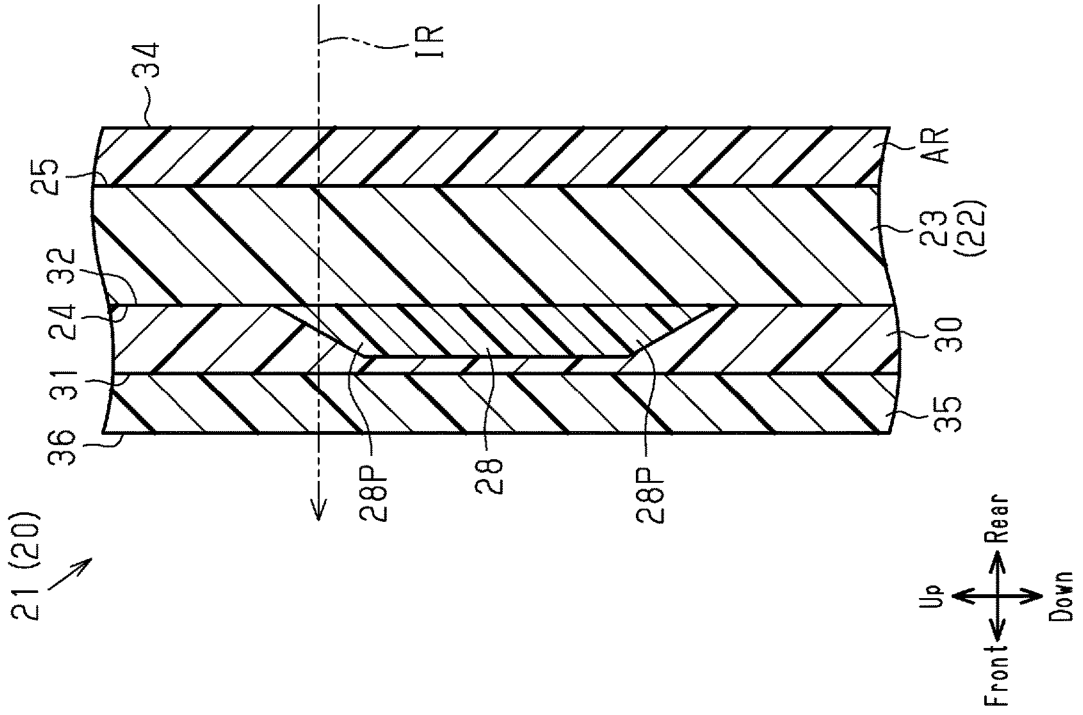
FIG. 2 is a partial cross-sectional view showing a layer structure of a cover body in a near-infrared transmissive cover according to the first embodiment.
Figure 1:
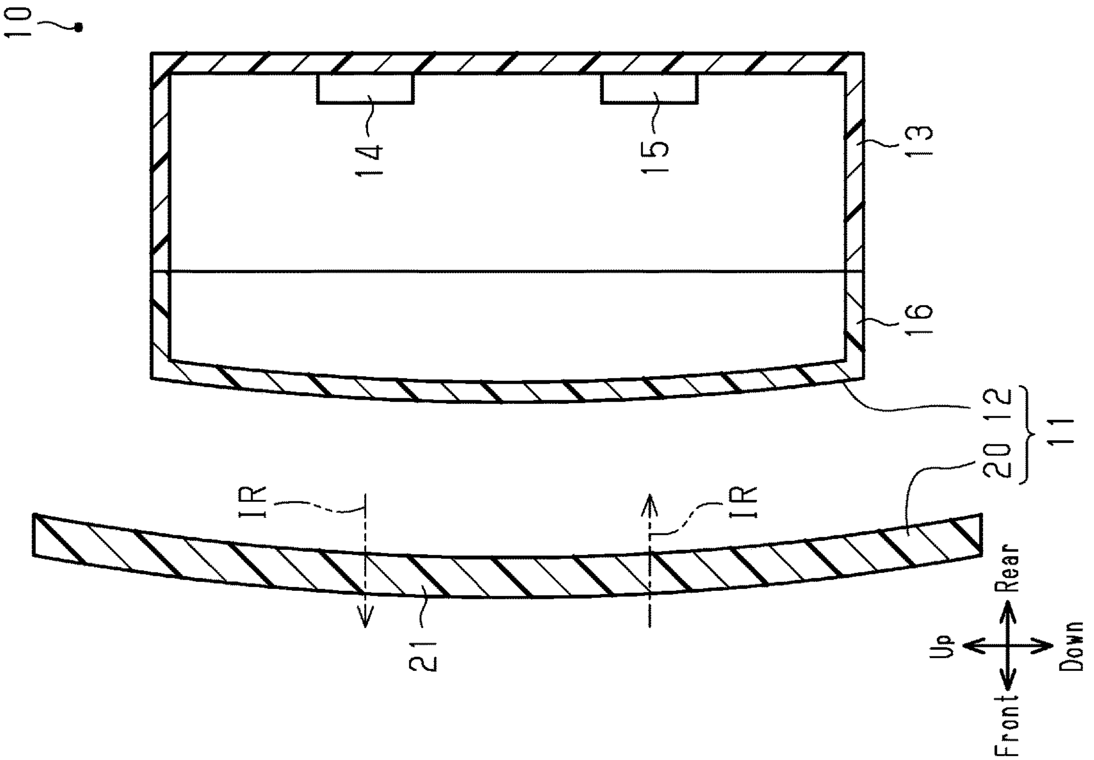
FIG. 1 is a cross-sectional view showing a sensor module according to a first embodiment.
Figure 18:
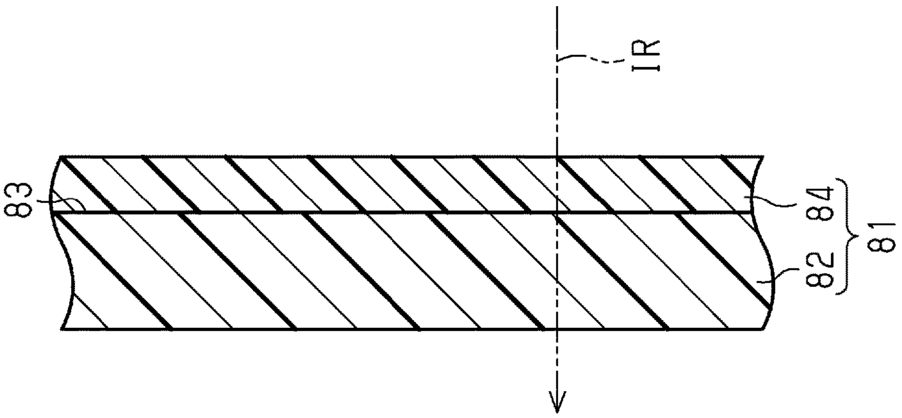
Fig.18 (RELATED ART)
FIG. 18 is a partial cross-sectional view showing a cover body in a near-infrared transmissive cover of a related art.
Figure 19:
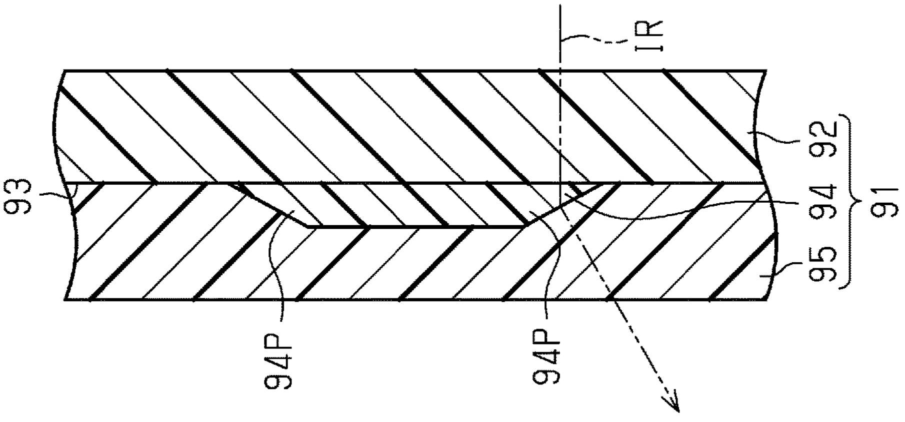
Fig.19 (RELATED ART)
FIG. 19 is a partial cross-sectional view showing a cover body in a near-infrared transmissive cover of a related art.

As shown in FIGS. 1 and 2, the land vehicle 10 is equipped with a sensor module 11, which includes a near-infrared sensor 12 and a near-infrared transmissive cover 20. In FIGS. 2 and 3, in order to make the size of each component of a cover body 21 of the near-infrared transmissive cover 20 recognizable, the scale of each component is altered as necessary. The same applies to FIGS. 12 to 14, which illustrate other embodiments, and the same applies to FIGS. 18 and 19, which illustrate a related art.

The components of the sensor module 11 will now be described.

Near-Infrared Sensor 12

As shown in FIG. 1, the land vehicle 10 includes a front-monitoring near-infrared sensor 12.

The rear half of the outer shell of the near-infrared sensor 12 is formed by a case 13, of which the front end is open. The front half of the outer shell of the near-infrared sensor 12 is formed by a cover 16. The case 13 incorporates an emitting unit 14 and a receiving unit 15 for near-infrared rays IR. The emitting unit 14 may include an emission circuit. The emitting unit 14 emits near-infrared rays IR having a wavelength of around 900 nm to the outside of the land vehicle 10, while changing an emission direction within a predetermined angular range. The receiving unit 15 may include a reception circuit. The receiving unit 15 receives the near-infrared rays IR that have struck and have been reflected by an object outside the land vehicle including, for example, the leading vehicle and a pedestrian.

As described above, the near-infrared sensor 12 emits the near-infrared rays IR forward from the land vehicle 10. Thus, the emission direction of the near-infrared rays IR from the near-infrared sensor 12 is the direction from the rear toward the front of the land vehicle 10. The front in the emission direction of the near-infrared rays IR substantially agrees with the forward direction of the land vehicle 10. The rear in the emission direction also substantially agrees with the rear of the land vehicle 10. Accordingly, in the following description, the front in the emission direction of the near-infrared rays IR will simply be referred to as "front" or "forward." The rear in the emission direction will simply be referred to as "rear" or "rearward."

The cover 16 is arranged in front of the case 13 to cover the emitting unit 14 and the receiving unit 15 from the front.

Near-Infrared Transmissive Cover 20

The near-infrared transmissive cover 20 is provided separately from the near-infrared sensor 12.

As shown in FIGS. 1 and 2, the framework of the near-infrared transmissive cover 20 is formed by the plate-shaped cover body 21, which has transmissiveness to the near-infrared rays IR. The cover body 21 is arranged in front of the near-infrared sensor 12 to indirectly cover the emitting unit 14 and the receiving unit 15 from the front with the cover 16 in between. In this embodiment, the entire cover body 21 is gently curved to bulge forward.

The near-infrared transmissive cover 20 includes attachment portions (not shown) in addition to the cover body 21. The near-infrared transmissive cover 20 is attached to the body (not shown) of the land vehicle 10 at the attachment portions by screw fastening, a snap-fit structure, or the like.

The near-infrared transmissive cover 20 covers the emitting unit 14 and the receiving unit 15 from the front to protect the near-infrared sensor 12 from impacts and the like, and also decorates the front portion of the land vehicle 10.

As shown in FIG. 2, the framework of the cover body 21 is formed by a base 22, which includes a plate-shaped base body 23. The base 22 is made of polycarbonate (PC) plastic. Instead, the base 22 may be made of an acrylic plastic such as polymethyl methacrylate (PMMA) plastic.

The cover body 21 includes the base body 23, a decorative layer 28, a coating layer 30, a reflection suppression portion AR, and a hard coating layer 35. A front surface 24 of the base body 23 is formed by a single smooth surface. A "smooth surface" as used in this description refers to a surface having no unevenness, and includes not only a flat surface but also a surface that is gently curved as a whole.

The decorative layer 28 is formed by a member different from the base 22 and protrudes forward from the base body 23. In the first embodiment, the decorative layer 28 is formed by a colored coating film layer. The decorative layer 28 is formed by applying paint to part of the front surface 24 of the base body 23.

The coating layer 30 is molded with a plastic to be laminated onto the base body 23 from the front while covering the decorative layer 28. A front surface 31 of the coating layer 30 is formed by a single smooth surface.

During the formation of the decorative layer 28 by painting, the occurrence of so-called paint dripping makes it difficult to form the decorative layer 28 in a rectangular cross-sectional shape. A peripheral portion 28P of the decorative layer 28 is inclined with respect to the front surface 24 of the base body 23 due to the above-described paint dripping. The coating layer 30 is adjacent to the decorative layer 28 and the base body 23. The part of the coating layer 30 at the boundary with the peripheral portion 28P is also inclined with respect to the front surface 24.

The decorative layer 28 and the coating layer 30 are respectively made of plastic materials having a difference in refractive index of less than or equal to 0.03. The minimum value of the difference in refractive index is 0. When the decorative layer 28 and the coating layer 30 are made of the same plastic material, the difference in refractive index is 0.

The refractive index is a fundamental physical quantity related to the propagation of light (in this case, the near-infrared rays IR) in a material and is represented by the propagation speed of light in air divided by the propagation speed of light in the material. Since the propagation speed of light differs between the materials, the refractive index differs between the materials.

Examples of the plastic materials include a combination of an acrylic resin and an acrylic resin, a combination of an epoxy resin and an epoxy resin, and a combination of an acrylic resin and an epoxy resin.

Figure 3:
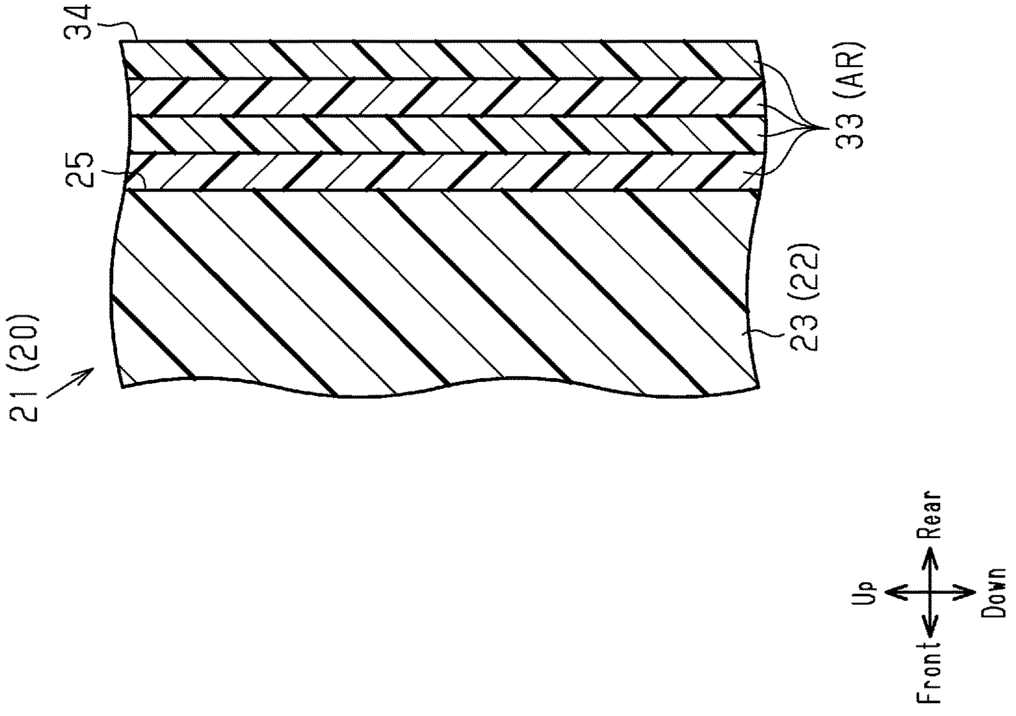
FIG. 3 is an enlarged partial cross-sectional view showing a reflection suppression portion according to the first embodiment.

As shown in FIGS. 2 and 3, the reflection suppression portion AR is located at the rearmost part of the cover body 21. The reflection suppression portion AR reduces reflection of the near-infrared rays IR emitted from the emitting unit 14 by interference with the near-infrared rays IR and limits a decrease in the amount of the near-infrared rays IR that pass through the cover body 21 due to the reflection.

In the first embodiment, the reflection suppression portion AR is formed by laminating reflection suppression layers 33, each including a thin film, onto a rear surface 25 of the base body 23. The reflection suppression layers 33 are formed by performing vacuum deposition, sputtering, or wet coating. The reflection suppression layers 33 may have different refractive indexes or thicknesses. This allows the phase of the near-infrared rays IR reflected by the reflection suppression layers 33 to be different from each other. This configuration reduces reflection of the near-infrared rays IR in a wide range of wavelengths. The reflection suppression portion AR may include a single reflection suppression layer 33.

The reflection suppression layer 33 is laminated onto the entire rear surface 25 of the base body 23. The surface onto which the reflection suppression layer 33 is laminated includes a region irradiated with the near-infrared rays IR. A rear surface 34 of the reflection suppression portion AR forms the rear surface of the cover body 21.

As shown in FIG. 2, the hard coating layer 35 is laminated onto the front surface 31 of the coating layer 30. The hard coating layer 35 has a higher hardness than the coating layer 30 and permits passage of the near-infrared rays IR. A front surface 36 of the hard coating layer 35 forms the front surface of the cover body 21.

In the components of the cover body 21, the base body 23 has a thickness in the millimeter (mm) order, for example, approximately 2 to 4 mm thick. The decorative layer 28, the coating layer 30, and the hard coating layer 35 each have a thickness in the micrometer (μm) order. The reflection suppression portion AR has a thickness in the nanometer (nm) order.

In the first embodiment, all components of the cover body 21 are respectively made of plastic materials having a difference in refractive index of less than or equal to 0.03 between each adjacent pair of the components.

Operation of the first embodiment will now be described.

When the emitting unit 14 of the near-infrared sensor 12 emits the near-infrared rays IR while changing the emission direction in the predetermined angular range, the near-infrared rays IR are irradiated onto the cover body 21 from the rear. The reflection suppression portion AR is arranged at the rearmost part of the cover body 21. Thus, the reflection suppression portion AR suppresses reflection of the emitted near-infrared rays IR. Accordingly, the amount of the near-infrared rays IR that pass through the reflection suppression portion AR is increased.

The near-infrared rays IR that have passed through the reflection suppression portion AR pass through a portion of the cover body 21 that is forward of the reflection suppression portion AR. After passing through the cover body 21, the near-infrared rays IR strike and are reflected by an object outside the land vehicle 10, such as the leading land vehicle, a pedestrian, or the like, and then pass through the cover body 21 again. After passing through the cover body 21, the near-infrared rays IR are received by the receiving unit 15. Based on the emitted near-infrared rays IR and the received near-infrared rays IR, the near-infrared sensor 12 recognizes the object and detects the distance between the land vehicle 10 and the object and the relative velocity. The recognition includes detection of the position (angle) of the object.

A portion (step) that is inclined with respect to the front surface 24 of the base body 23 is formed at the boundary between the peripheral portion 28P of the decorative layer 28 and a portion of the coating layer 30 that covers the peripheral portion 28P. The difference in refractive index between the decorative layer 28 and the coating layer 30 is small, being less than or equal to 0.03. Thus, when passing through the step, the near-infrared rays IR are unlikely to be refracted at the boundary between the decorative layer 28 and the coating layer 30.

Further, the difference in the refractive index between each component of the cover body 21 and a component adjacent to it is small, being less than or equal to 0.03. Thus, when the near-infrared rays IR emitted from the emitting unit 14 pass through the cover body 21, the near-infrared rays IR are unlikely to be refracted at the boundary between adjacent components.

When the cover body 21 is irradiated with visible light from the front, some of the visible light passes through the hard coating layer 35 and the coating layer 30 and is reflected or absorbed by the decorative layer 28. When the near-infrared transmissive cover 20 is seen from the front of the land vehicle 10, the colored decorative layer 28 appears to be located rearward (far side) of the coating layer 30 and in front (near side) of the base body 23 through the hard coating layer 35 and the coating layer 30.

Further, the hard coating layer 35, which forms the frontmost part of the cover body 21, increases the impact resistance of the cover body 21. Further, the hard coating layer 35 increases the weather resistance of the cover body 21.

The first embodiment has the following advantages.

(1-1) In the first embodiment, the decorative layer 28 and the coating layer 30 are made of plastic materials chosen to have a difference in refractive index (0.03 or less). This suppresses the refraction of the near-infrared rays IR at the boundary (step) between the peripheral portion 28P of the decorative layer 28 and the coating layer 30. The near-infrared sensor 12 can detect the position (angle) of the object outside the land vehicle 10 with high accuracy also by the near-infrared rays IR that have passed through the step, as in a case with near-infrared rays IR that have passed through portions different from the step.

A comparative example will now be described in which the angle of the object is detected only by using the near-infrared rays IR that have passed through portions different from the step. Analysis has shown that, when the angle of the object is detected by using the near-infrared rays IR that have passed through the step, the detection error can be kept within 0.1° compared to the aforementioned comparative example.

(1-2) In the first embodiment, all components of the cover body 21, including the decorative layer 28 and the coating layer 30, are respectively made of plastic materials having a difference in refractive index of less than or equal to 0.03 between each adjacent pair of the components.

This improves the detection accuracy of the near-infrared sensor 12 as compared to a case in which only the decorative layer 28 and the coating layer 30 are made of plastic materials having a difference in refractive index of less than or equal to 0.03.

(1-3) In the first embodiment, the rearmost part of the cover body 21 is formed by the reflection suppression portion AR (reflection suppression layer 33). This reduces the amount of the near-infrared rays IR reflected by the cover body 21 and increases the amount of the near-infrared rays IR that pass through the cover body 21. Thus, the cover body 21 is prevented from hindering the passage of the near-infrared rays IR, and the amount of the near-infrared rays IR that are attenuated when passing through the cover body 21 is limited to a permissible range. This allows the near-infrared sensor 12 to readily perform the above-described detection function.

(1-4) In the first embodiment, the decorative layer 28, which protrude forward from the base body 23, is formed on the front surface 24 of the base body 23. Thus, the decorative layer 28 decorates the near-infrared transmissive cover 20, improving the appearance of the near-infrared transmissive cover 20 and the surrounding portion.

(1-5) In the first embodiment, the hard coating layer 35 prevents the cover body 21 from being scratched by flying pebbles and the like. In addition, the hard coating layer 35 prevents the cover body 21 from being altered or degraded due to sunlight, weather, temperature changes, and the like. This also allows the near-infrared sensor 12 to readily detect the position of the object, and detect the distance and the relative velocity.

Second Embodiment

Figure 4:
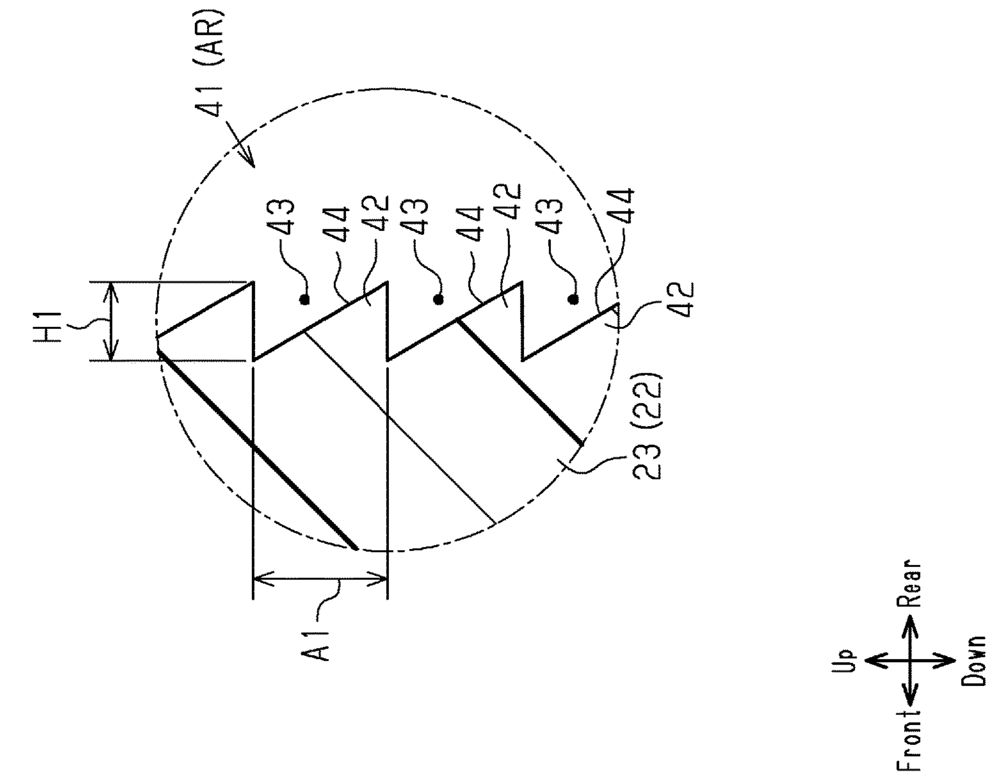
FIG. 4 is an enlarged partial cross-sectional view showing a reflection suppression portion according to a second embodiment.
Figure 5:
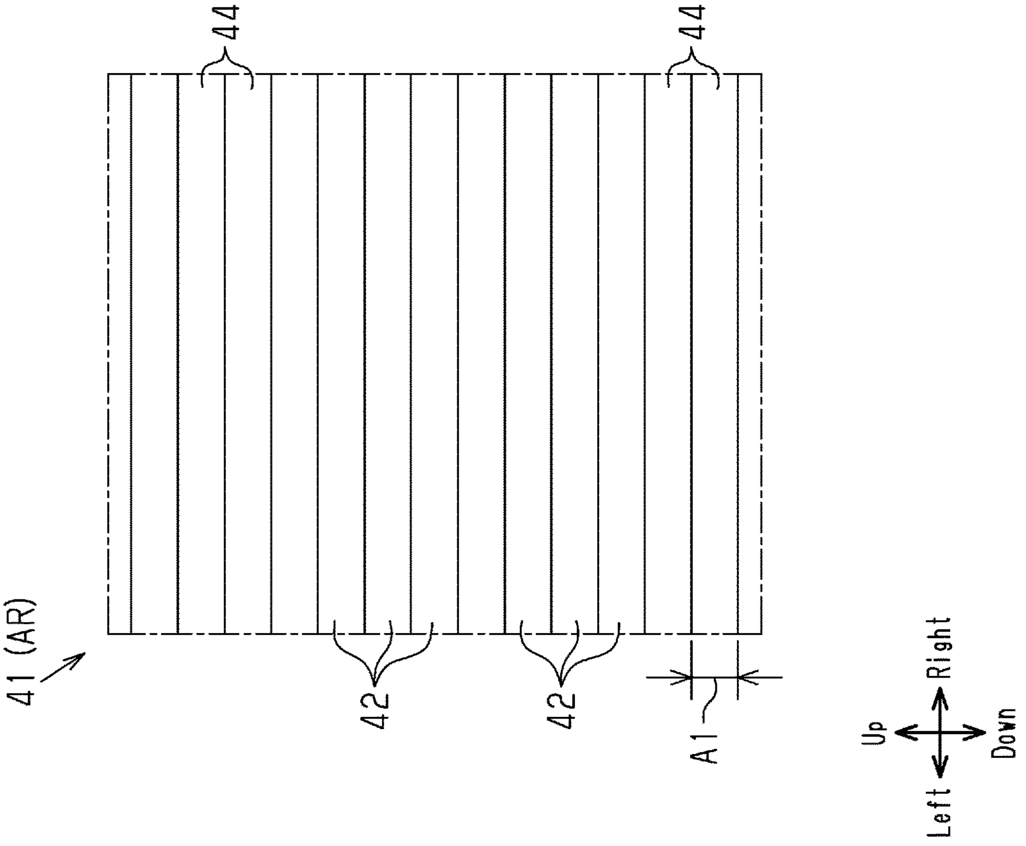
FIG. 5 is an enlarged partial rear view showing the reflection suppression portion according to the second embodiment.

A sensor module 11 for a land vehicle 10 according to a second embodiment of the present disclosure will now be described with reference to FIGS. 4 and 5. In the second embodiment, a reflection suppression portion AR is formed by a reflection suppression structure 41, which has asperities. The reflection suppression structure 41 is formed on the rear portion of the base body 23.

The reflection suppression structure 41 includes minute protrusions 42 having the same cross-sectional shapes. The cross-sectional shape of each protrusion 42 is a right triangle. The protrusions 42 extend in parallel in the left-right direction (vehicle width direction) while being adjacent to each other in the vertical direction. A height H1 of each protrusion 42 from the bottom to the vertex is constant in the direction in which the protrusion 42 extends. The space between each adjacent pair of the protrusions 42 is a minute groove 43 having a triangular cross section. Combinations of the protrusions 42 and the grooves 43 are repeated in the arrangement direction of the protrusions 42 (vertical direction in this embodiment). This repetitive structure forms the reflection suppression structure 41 having a moth-eye structure with minute asperities. The moth-eye structure refers to an asperity structure as observed on the surface of the eye of a moth, and has an average cycle shorter than the wavelength of rays (the near-infrared rays IR in this case). Each protrusion 42 includes a reflection suppression surface 44, which is inclined relative to the emission direction of the near-infrared rays IR and reflects the near-infrared rays IR. The height H1 of each protrusion 42 and the measurement A1 of the bottom of each protrusion 42 in the arrangement direction of the protrusions 42 are each set to be less than half the wavelength of the near-infrared rays IR.

The cross section of the reflection suppression structure 41 is triangular wave-shaped (sawtooth shaped) as a whole.

The configuration, other than the above, is the same as the first embodiment. Thus, in the second embodiment, the same components as those in the first embodiment are given the same reference numerals, and detailed explanations are omitted.

Operation of the second embodiment will now be described.

The reflection suppression structure 41 of the second embodiment suppresses reflection using the moth-eye structure. Thus, the near-infrared rays IR emitted from the emitting unit 14 are radiated on the reflection suppression structure 41. At this time, the reflection suppression surfaces 44 suppress reflection of the near-infrared rays IR. That is, due to the moth-eye structure, the pseudo-refractive index continuously changes from the vertex to the bottom of each protrusion 42. This effectively suppresses reflection of the near-infrared rays IR on the reflection suppression structure 41.

The amount of the near-infrared rays IR that pass through the reflection suppression structure 41 increases by the suppressed amount of reflection of the near-infrared rays IR by the reflection suppression structure 41.

Therefore, according to the second embodiment, although the configuration of the reflection suppression portion AR is different from that of the first embodiment, the second embodiment is the same as the first embodiment in that attenuation of the near-infrared rays IR is suppressed by suppressing reflection of the near-infrared rays IR. The second embodiment thus achieves the same advantages as the first embodiment. In addition to the ones listed above, the second embodiment has the following advantages.

(2-1) In the second embodiment, the sensor module 11 (the near-infrared transmissive cover 20) is provided in the front portion of the land vehicle 10, and the direction parallel to the protrusions 42 is the vehicle width direction. This configuration has a low angular dependency and is capable of detecting the near-infrared rays IR in a wide area and in a wide angular range, as compared to a case in which the direction parallel to the protrusions 42 is the vertical direction.

Third Embodiment

Figure 6:
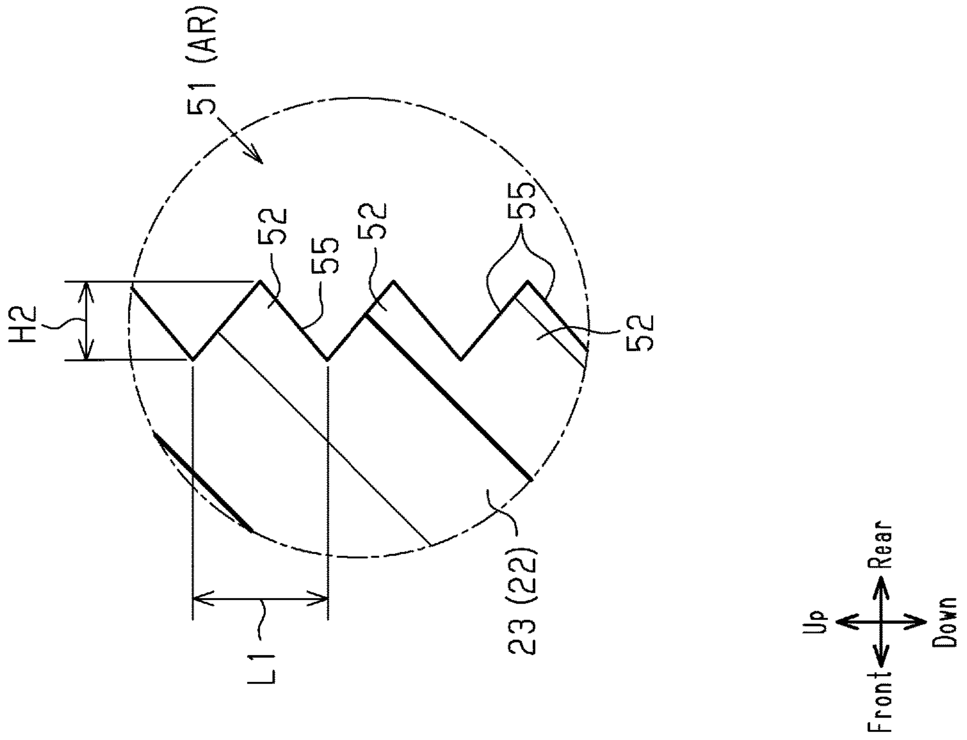
FIG. 6 is an enlarged partial cross-sectional view showing a reflection suppression portion according to a third embodiment.
Figure 7:
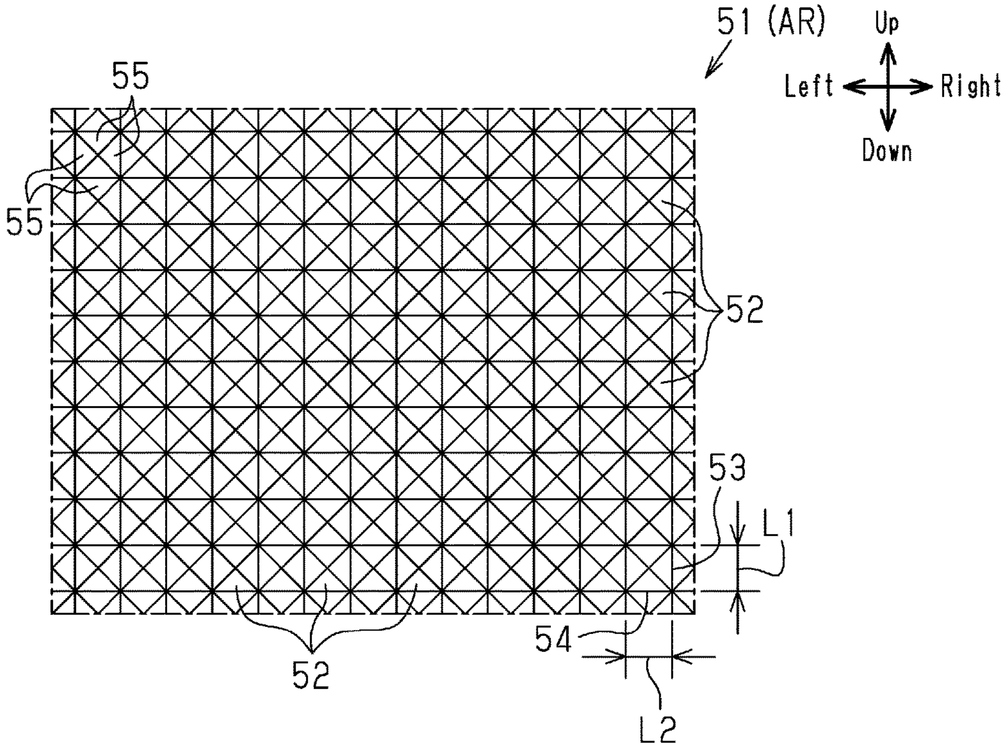
FIG. 7 is an enlarged partial rear view showing the reflection suppression portion according to the third embodiment.

A sensor module for a land vehicle according to a third embodiment of the present disclosure will now be described with reference to FIGS. 6 and 7. In the third embodiment, a reflection suppression structure 51 includes polygonal pyramid-shaped projections 52.

The projections 52 each have the shape of a quadrangular pyramid. Each projection 52 has bases 53 and bases 54, which are adjacent and orthogonal to each other. The projections 52 are arranged along the bases 53 and the bases 54. Each projection 52 has an isosceles triangle-shaped cross section and includes reflection suppression surfaces 55, which are inclined relative to the emission direction. The height H2 of each projection 52 from the bottom to the vertex, the length L1 of the base 53, and the length L2 of the base 54 are each set to be less than half the wavelength of the near-infrared rays IR.

The configuration, other than the above, is the same as the second embodiment. Thus, in the third embodiment, the same components as those in the second embodiment are given the same reference numerals, and detailed explanations are omitted.

Operation of the third embodiment will now be described.

As in the second embodiment, the reflection suppression structure 51 of the third embodiment suppresses reflection using the moth-eye structure. Thus, when the near-infrared rays IR emitted from the emitting unit 14 are radiated on the reflection suppression structure 51, the reflection suppression surface 55 suppresses reflection of the near-infrared rays IR. That is, due to the moth-eye structure, the pseudo-refractive index continuously changes from the vertex to the bottom of each projection 52. This effectively suppresses reflection of the near-infrared rays IR on the reflection suppression structure 51. The amount of the near-infrared rays IR that pass through the cover body 21 increases by the suppressed amount of suppression of the near-infrared rays IR by the reflection suppression structure 51.

The third embodiment thus achieves the same advantages as the second embodiment. In addition to the ones listed above, the third embodiment has the following advantages.

(3-1) In the third embodiment, each projection 52 has the shape of a polygonal pyramid. Thus, the third embodiment suppresses reflection of the near-infrared rays IR in a greater number of directions than in the second embodiment. That is, the angular dependence of the incident near-infrared rays IR is dealt with.

Fourth Embodiment

Figure 8:
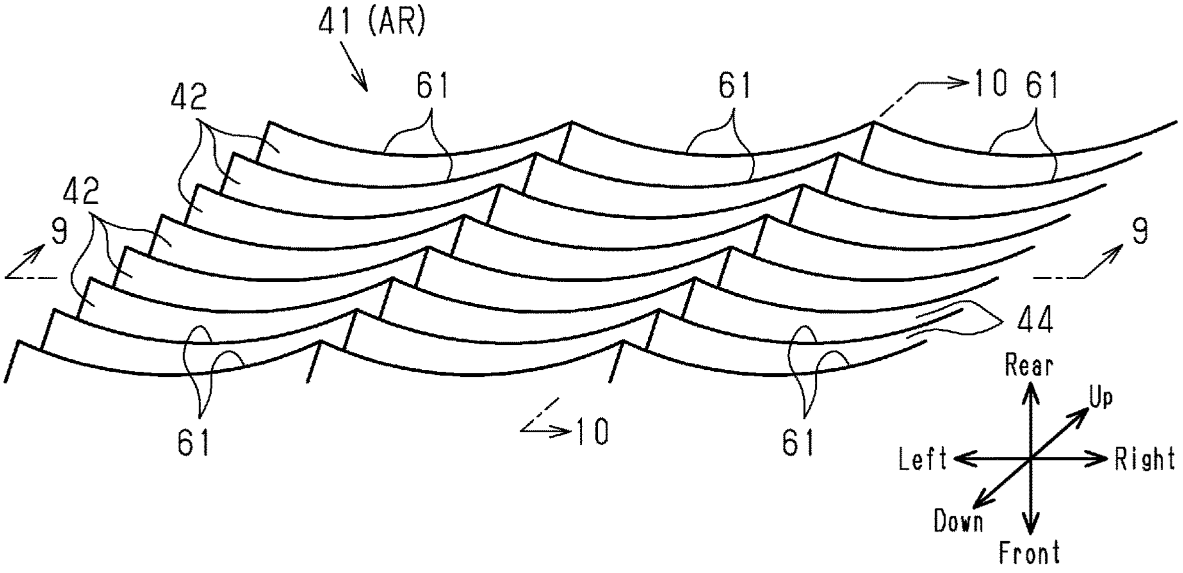
FIG. 8 is an enlarged partial perspective view showing a reflection suppression portion according to a fourth embodiment.
Figure 9:
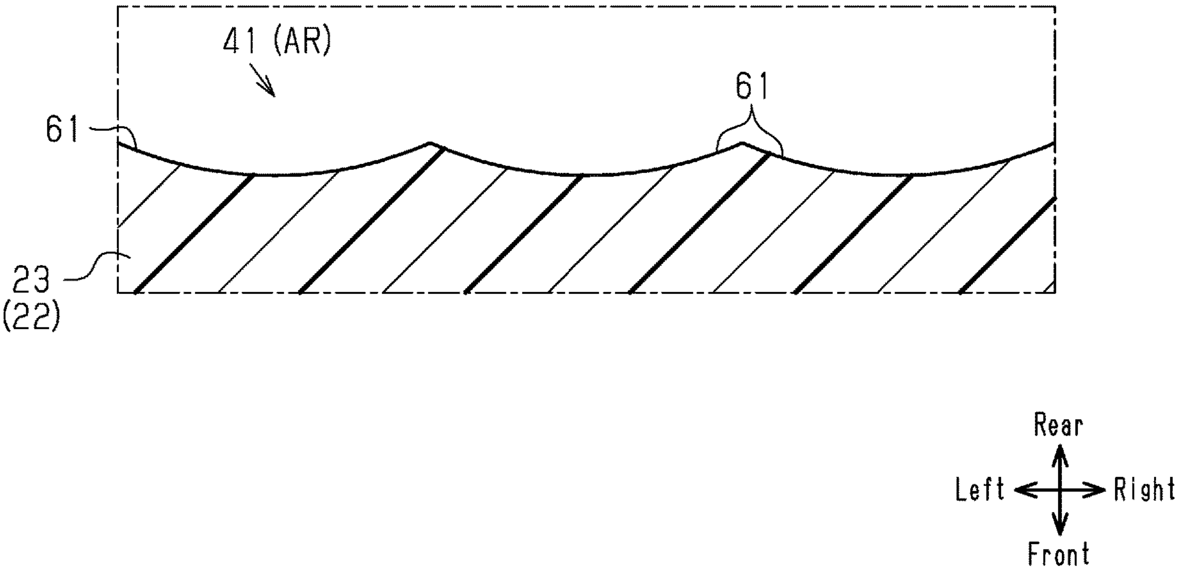
FIG. 9 is a cross-sectional view taken along line 9-9 in FIG. 8.

A sensor module for a land vehicle according to a fourth embodiment of the present disclosure will now be described with reference to FIGS. 8 to 10.

In the fourth embodiment, a reflection suppression portion AR has a configuration different from that of the reflection suppression structure 41 of the second embodiment.

Figure 10:
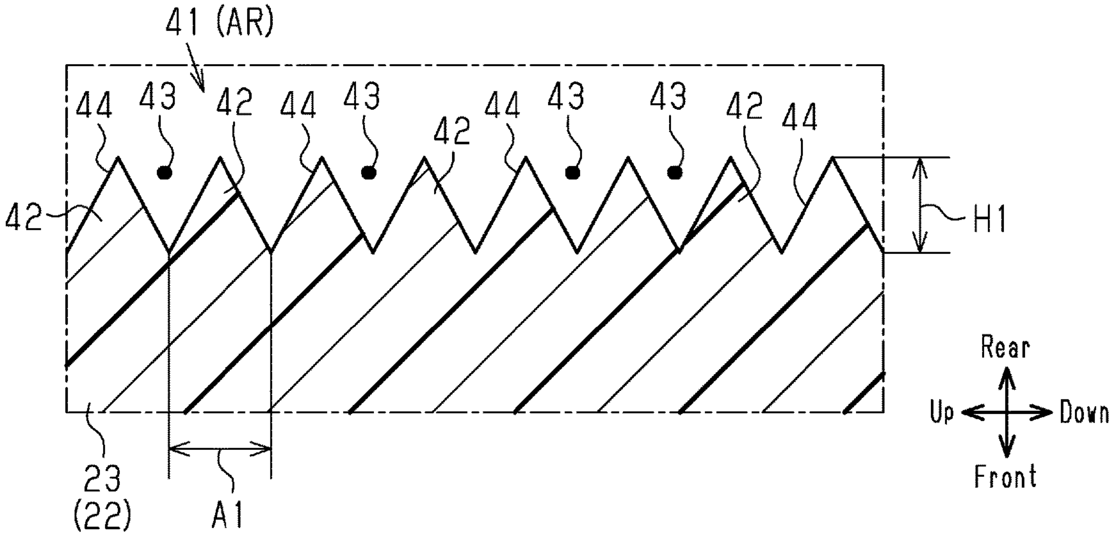
FIG. 10 is a cross-sectional view taken along line 10-10 in FIG. 8.

Each protrusion 42 has an isosceles triangle-shaped cross section (see FIG. 10). Each protrusion 42 has concavities 61, which are arcuately recessed from the vertex toward the bottom and have a depth that changes in the direction in which the protrusion 42 extends (refer to FIGS. 8 and 9). The concavities 61 are continuous with each other in the direction in which the protrusion 42 extends. That is, adjacent concavities 61 are connected to each other at the shallowest sections, in other words, at the highest positions (farthest positions from the bottom) of the protrusions 42. Each protrusion 42 includes a reflection suppression surface 44, which is inclined relative to the emission direction of the near-infrared rays IR and reflects the near-infrared rays IR (see FIG. 10).

The height H1 of each protrusion 42 from the bottom to the vertex changes in the direction in which the protrusion 42 extends. The height H1 of each protrusion 42 from the bottom to the vertex and the measurement A1 of the bottom of each protrusion 42 in the arrangement direction of the protrusions 42 are each set to be less than half the wavelength of the near-infrared rays IR.

The configuration, other than the above, is the same as the second embodiment. Thus, in the fourth embodiment, the same components as those in the second embodiment are given the same reference numerals, and detailed explanations are omitted.

Operation of the fourth embodiment will now be described.

In the fourth embodiment, in which the arcuately shaped concavities 61 are formed to be connected together in the direction in which the protrusions 42 extend, the reflection suppression structure 41 suppresses reflection using the moth-eye structure as in the second embodiment. That is, due to the moth-eye structure, the pseudo-refractive index continuously changes from the vertex to the bottom of each protrusion 42. This effectively suppresses reflection of the near-infrared rays IR. The fourth embodiment thus achieves the same advantages as the second embodiment.

Fifth Embodiment

A sensor module for a land vehicle according to a fifth embodiment of the present disclosure will now be described with reference to FIG. 11.

Figure 11:
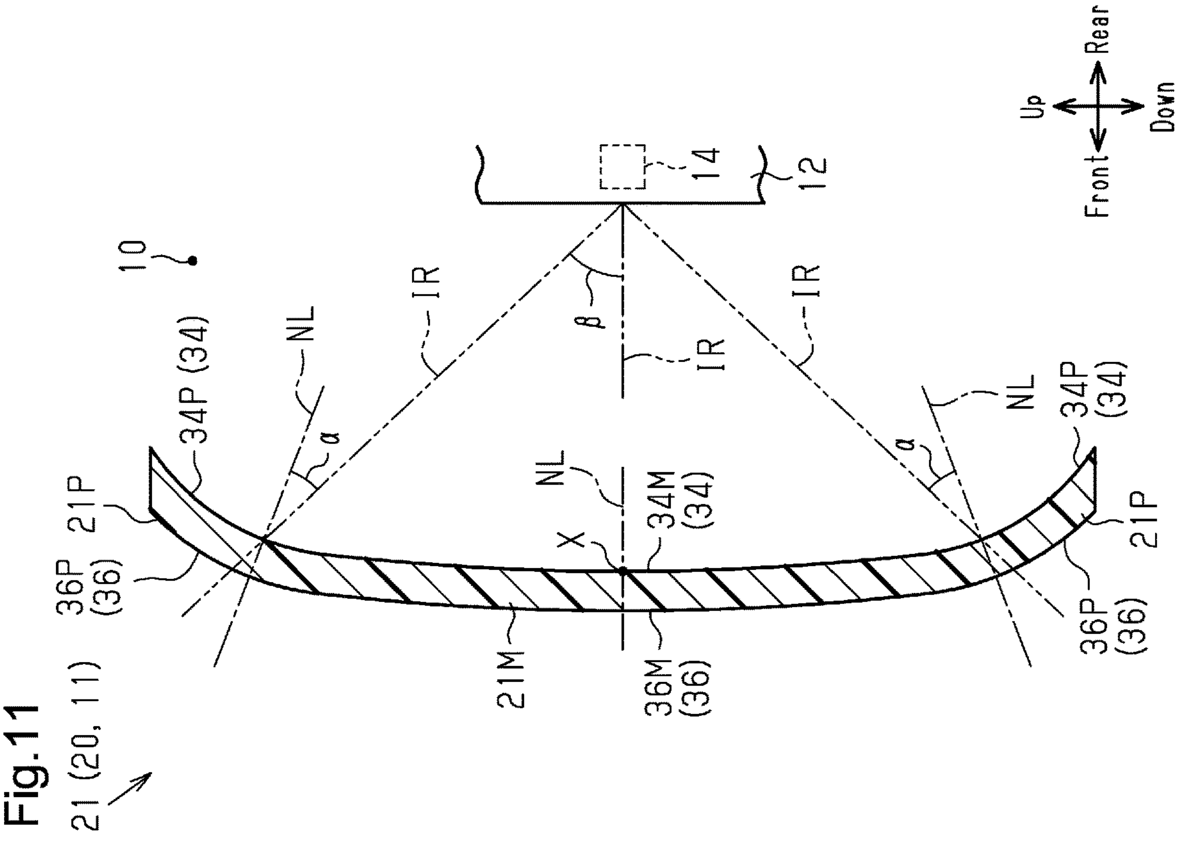
FIG. 11 is a cross-sectional view showing a cover body in a near-infrared transmissive cover according to a fifth embodiment.

Although a cover body 21 shown in FIG. 11 appears to be formed by a single layer, the cover body 21 has the same layer structure as the cover body 21 of the near-infrared transmissive cover 20 according to the first embodiment. As shown in FIG. 2, the multiple layers include a base body 23, which is located at the intermediate part in the front-rear direction, a decorative layer 28, a coating layer 30, and a hard coating layer 35, which are laminated together forward of the base body 23, and a reflection suppression portion AR, which is located at the rearmost part of the cover body 21. The same applies to FIGS. 15 (ninth embodiment), 16 (tenth embodiment), and 17 (eleventh embodiment).

As shown in FIG. 11, the cover body 21 includes an intermediate portion 21M and a peripheral portion 21P in the fifth embodiment. The intermediate portion 21M includes a portion that is irradiated with the near-infrared rays IR when the emitting unit 14 emits the near-infrared rays IR toward a central part of the angular range. The peripheral portion 21P surrounds the intermediate portion 21M of the cover body 21.

The peripheral portion 21P is located rearward of the intermediate portion 21M. The peripheral portion 21P is curved to bulge forward and to be located rearward as the peripheral portion 21P extends away from the intermediate portion 21M. The cover body 21 has such a shape because the base body 23, which occupies most of the thickness of the cover body 21, has the same shape. The thickness of each of the decorative layer 28, the coating layer 30, the hard coating layer 35, and the reflection suppression portion AR is significantly smaller than the thickness of the base body 23. The decorative layer 28, the coating layer 30, the hard coating layer 35, and the reflection suppression portion AR are shaped in conformance with the base body 23.

Thus, a rear surface 34P of the peripheral portion 21P of the cover body 21 is located rearward of a rear surface 34M of the intermediate portion 21M. The rear surface 34P is curved to bulge forward and to be located rearward as the rear surface 34P extends away from the intermediate portion 21M.

Likewise, a front surface 36P of the peripheral portion 21P is located rearward of a front surface 36M of the intermediate portion 21M. The front surface 36P is curved to bulge forward and to be located rearward as the front surface 36P extends away from the intermediate portion 21M.

The configuration, other than the above, is the same as the first embodiment. Thus, in the fifth embodiment, the same components as those in the first embodiment are given the same reference numerals, and detailed explanations are omitted.

Operation of the fifth embodiment will now be described. Differences from the operation of the first embodiment will mainly be discussed.

An angle formed by the near-infrared rays IR emitted from the emitting unit 14 and incident on the rear surface 34 of the cover body 21 and a normal NL on the rear surface 34 is referred to as an angle of incidence α. As the angle of incidence α increases, the amount of the near-infrared rays IR reflected by the rear surface 34 increases. This reduces the amount of the near-infrared rays IR that pass through the cover body 21.

The emission direction of the near-infrared rays IR emitted by the emitting unit 14 is changed within the above-described angular range.

The emission direction of the near-infrared rays IR toward a central part of the angular range is referred to as a central emission direction. When the near-infrared rays IR are emitted in the central emission direction, the near-infrared rays IR are radiated to the rear surface 34M of the intermediate portion 21M. The portion of the rear surface 34M irradiated with the near-infrared rays IR is referred to as a central irradiation section X.

The normal NL at the central irradiation section X extends in the central emission direction. Thus, in the central irradiation section X, the angle of incidence α of the near-infrared rays IR is small, and the amount of the reflected near-infrared rays IR is small.

As the section on the rear surface 34 that is irradiated with the near-infrared rays IR is shifted away from the central irradiation section X, an angle β formed by the emission direction of the near-infrared rays IR and the central emission direction increases.

Thus, if, at a position on the rear surface 34 different from the central irradiation section X, the normal NL extends in a direction aligned with the normal NL at the central irradiation section X, the angle of incidence α increases as the distance from the central irradiation section X increases, resulting in a greater amount of reflection of the near-infrared rays IR.

The rear surface 34P of the peripheral portion 21P, which surrounds the intermediate portion 21M, is significantly distanced from the central irradiation section X.

However, in the fifth embodiment, the rear surface 34P is located rearward of the rear surface 34M of the intermediate portion 21M. In addition, the rear surface 34P is curved to meet the above-described conditions. Thus, at any position on the rear surface 34P, the normal NL extends in the emission direction. The angle of incidence α of the near-infrared rays IR is small at any position on the rear surface 34P.

Thus, the fifth embodiment achieves the following advantage in addition to the advantages of the first embodiment.

(5-1) In the fifth embodiment, the peripheral portion 21P of the cover body 21 is curved more than the intermediate portion 21M. The rear surface 34P of the peripheral portion 21P is located rearward of the rear surface 34M of the intermediate portion 21M. The rear surface 34P is curved to bulge forward and to be located rearward as the rear surface 34P extends away from the intermediate portion 21M. Thus, at any position on the rear surface 34P, it is possible to reduce the angle of incidence α of the near-infrared rays IR, so as to increase the amount of the near-infrared rays IR that pass through the peripheral portion 21P. This further improves the detection accuracy of the near-infrared sensor 12.

Sixth Embodiment

A sensor module for a land vehicle according to a sixth embodiment of the present disclosure will now be described with reference to FIG. 12.

In the sixth embodiment, the reflection suppression portion AR is formed by a first reflection suppression portion AR1 in a region of the cover body 21 in which the angle of incidence α of the near-infrared rays IR emitted from the emitting unit 14 is less than 40°. The reflection suppression portion AR is formed by a second reflection suppression portion AR2 in a region of the cover body 21 in which the angle of incidence α is greater than or equal to 40°. The second reflection suppression portion AR2 suppresses reflection of a greater amount of the near-infrared rays IR than the first reflection suppression portion AR1 does.

In a case in which the reflection suppression portion AR is formed by laminating multiple reflection suppression layers 33 as in the first embodiment, the thickness of the first reflection suppression portion AR1 and the thickness of the second reflection suppression portion AR2 satisfy the following condition. The condition is that the total thickness of the second reflection suppression portion AR2 is must be at least 1.1 times greater than the total thickness of the first reflection suppression portion AR1.

Figure 12:
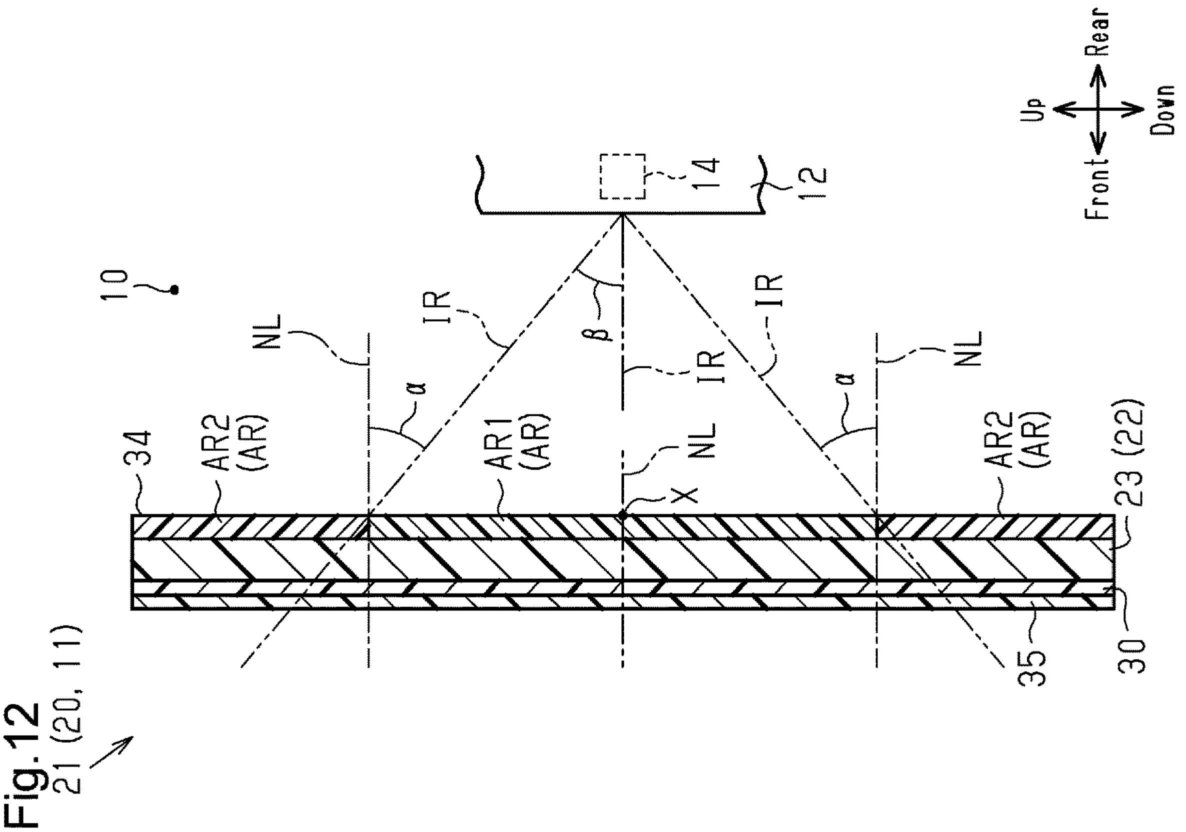
FIG. 12 is a cross-sectional view showing a cover body in a near-infrared transmissive cover according to a sixth embodiment.

Although FIG. 12 shows an example in which the cover body 21 has the shape of a flat plate, the cover body 21 may be gently curved to bulge forward as in the first embodiment. The decorative layer 28 is not illustrated in FIG. 12.

The configuration, other than the above, is the same as the first embodiment. Thus, in the sixth embodiment, the same components as those in the first embodiment are given the same reference numerals, and detailed explanations are omitted.

Operation of the sixth embodiment will now be described. Differences from the operation of the first embodiment will mainly be discussed.

As the angle of incidence α increases, the amount of the near-infrared rays IR reflected by the cover body 21 increases. This reduces the amount of the near-infrared rays IR that pass through the cover body 21. This point is the same as the fifth embodiment.

On the other hand, analysis has shown that when the angle of incidence α of near-infrared rays IR, emitted from the emitting unit 14 and radiated onto the rear surface 34 of the cover body 21, exceeds 40° degrees, the transmissivity is lower than a case in which the angle of incidence is less than 40°.

The reflection suppression portion AR, which forms the rearmost part of the cover body 21, suppresses reflection of the radiated near-infrared rays IR. The suppression of reflection increases the amount of the near-infrared rays IR passing through the cover body 21, accordingly.

In the region in the cover body 21 in which the angle of incidence α is less than 40°, reflection of the near-infrared rays IR is suppressed by the first reflection suppression portion AR1. In the region in which the angle of incidence α is greater than or equal to 40°, reflection of the near-infrared rays IR is suppressed to a greater extent by the second reflection suppression portion AR2 than by the first reflection suppression portion AR1.

Thus, the sixth embodiment achieves the following advantage in addition to the advantages of the first embodiment.

(6-1) In the sixth embodiment, the reflection suppression portion AR is formed by the first reflection suppression portion AR1 in a region in which the angle of incidence α of the near-infrared rays IR is less than 40°. The reflection suppression portion AR is formed by a second reflection suppression portion AR2 in a region in which the angle of incidence α is greater than or equal to 40°. The second reflection suppression portion AR2 suppresses reflection of a greater amount of the near-infrared rays IR than the first reflection suppression portion AR1 does. This reduces the amount of the near-infrared rays IR reflected in the region where the angle α is greater than or equal to 40°, so as to increase the amount of the near-infrared rays IR that passes through the region. This further improves the detection accuracy of the near-infrared sensor 12.

Seventh Embodiment

Figure 13:
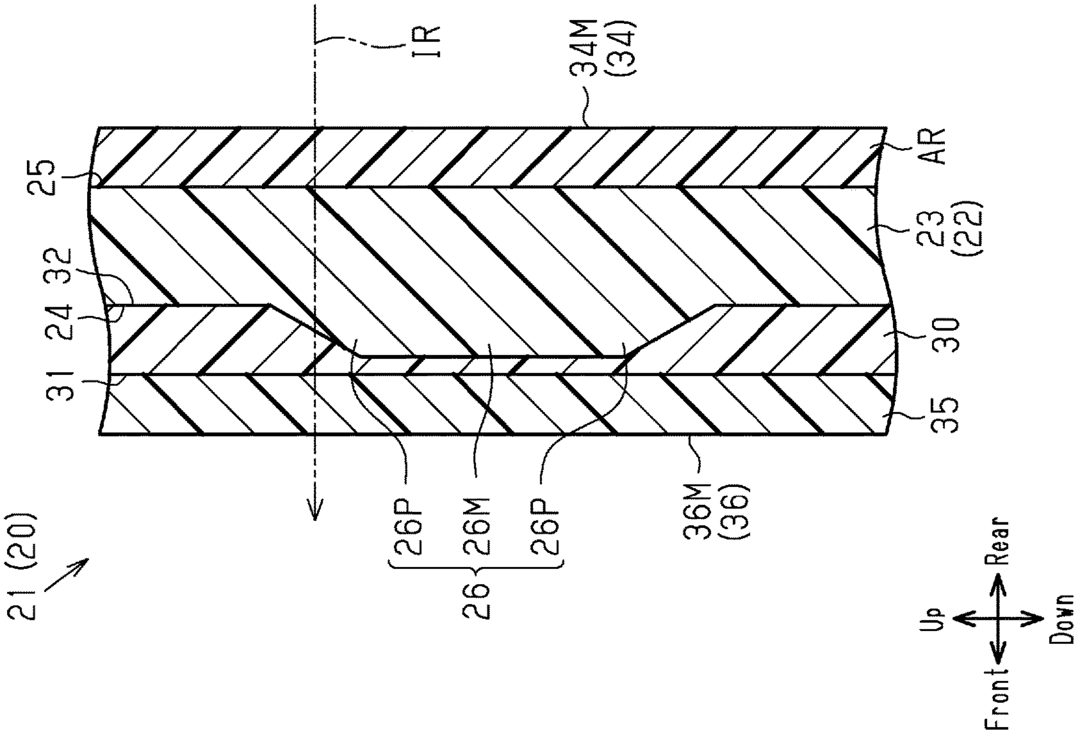
FIG. 13 is a partial cross-sectional view showing a layer structure of a cover body in a near-infrared transmissive cover according to a seventh embodiment.

A sensor module according to a seventh embodiment will now be described with reference to FIG. 13.

The seventh embodiment is different from the first embodiment, in which the decorative layer 28 is formed by a member different from the base 22. Specifically, the decorative layer 26 is formed by part of the base 22 in the seventh embodiment. The decorative layer 26 protrudes forward from the front surface 24 of the base body 23. The decorative layer 26 includes an intermediate portion 26M and a peripheral portion 26P that surrounds the intermediate portion 26M. The front surface of the intermediate portion 26M is formed by a single smooth surface. The peripheral portion 26P is inclined with respect to the front surface 24 so as to be located rearward as the peripheral portion 26P extends away from the intermediate portion 26M. In other words, the decorative layer 26 has a trapezoidal cross-sectional shape. The decorative layer 26 and the base body 23 are integrally formed of the same plastic material.

The decorative layer 26 and the coating layer 30 are respectively made of plastic materials having a difference in refractive index of less than or equal to 0.03. In the seventh embodiment, the decorative layer 26 is formed integrally with the base body 23. In this case, the base body 23 (the base 22) and the coating layer 30 are made of plastic materials having a difference in refractive index of less than or equal to 0.03.

The configuration, other than the above, is the same as the first embodiment. Thus, in the seventh embodiment, the same components as those in the first embodiment are given the same reference numerals, and detailed explanations are omitted.

The reflection suppression portions AR may include any of the reflection suppression structures 41, 51 of the second to fourth embodiments.

Even if the decorative layer 26 is formed as part of the base 22, a portion (step) that is inclined with respect to the front surface 24 of the base body 23 is formed at the boundary between the peripheral portion 26P of the decorative layer 26 and a portion of the coating layer 30 that covers the peripheral portion 26P. However, since the decorative layer 26 (the base 22) and the coating layer 30 are made of plastic materials having a difference in refractive index of less than or equal to 0.03, the near-infrared rays IR are unlikely to refract at the boundary between the decorative layer 26 and the coating layer 30 when passing through the step.

Thus, although the structure of the decorative layer 26 according to the seventh embodiment is different from that of the decorative layer 28 according to the first embodiment, the seventh embodiment has the following advantage, which corresponds to the advantage of item (1-1). Since the difference from the first embodiment is only the structure of the decorative layer 26, the seventh embodiment has the same advantages as the advantages of items (1-2) to (1-5) of the first embodiment.

(7-1) In the seventh embodiment, in which the decorative layer 26 is formed by part of the base 22, the decorative layer 26 (base 22) and the coating layer 30 are made of plastic materials chosen to have a difference in refractive index (0.03 or less). This suppresses refraction of the near-infrared rays IR at the inclined portion (step) between the peripheral portion 26P and the coating layer 30. The near-infrared sensor 12 can detect the position (angle) of the object outside the land vehicle 10 with high accuracy also by the near-infrared rays IR that have passed through the step, as in a case with near-infrared rays IR that have passed through portions different from the step.

Eighth Embodiment

Figure 14:
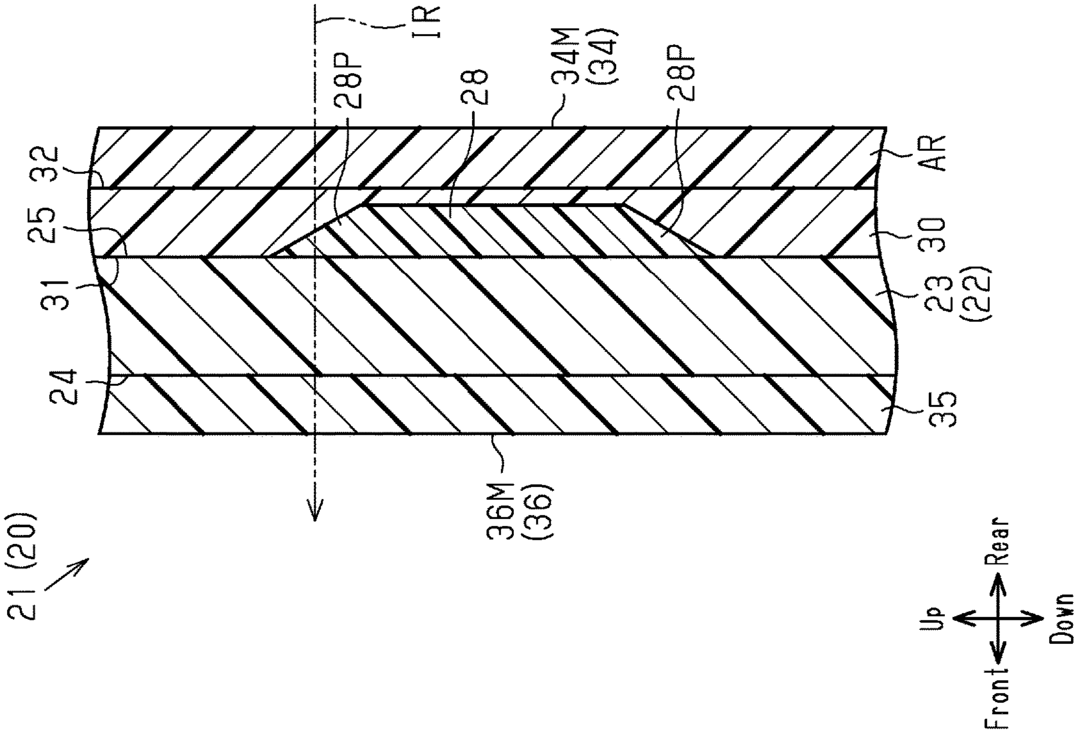
FIG. 14 is a partial cross-sectional view showing a layer structure of a cover body in a near-infrared transmissive cover according to an eighth embodiment.

A sensor module for a land vehicle according to an eighth embodiment of the present disclosure will now be described with reference to FIG. 14.

The eighth embodiment is different from the first embodiment, in which the decorative layer 28 and the coating layer 30 are located between the base body 23 and the hard coating layer 35. Specifically, the decorative layer 28 and the coating layer 30 are located between the base body 23 and the reflection suppression portion AR in the eighth embodiment. More specifically, the decorative layer 28 is formed by a member different from the base 22 and protrudes rearward from the base body 23. The decorative layer 28 is formed by a colored coating film layer. The coating film layer is formed by applying paint to a part of the rear surface 25 of the base body 23.

The coating layer 30 is molded with a plastic to be laminated onto the base body 23 from the rear while covering the decorative layer 28. A rear surface 32 of the coating layer 30 is formed by a single smooth surface.

As described in the first embodiment, during the formation of the decorative layer 28 by painting, paint dripping occurs. Thus, the peripheral portion 28P of the decorative layer 28 is inclined with respect to the rear surface 25 of the base body 23 due to paint dripping. The part of the coating layer 30 at the boundary with the peripheral portion 28P is also inclined with respect to the rear surface 25 of the base body 23.

The decorative layer 28 and the coating layer 30 are respectively made of plastic materials having a difference in refractive index of less than or equal to 0.03.

In place of the rear surface 25 of the base body 23, the reflection suppression portion AR is laminated onto the coating layer 30 from the rear side while being in close contact with the rear surface 32 of the coating layer 30. Instead of the front surface 31 of the coating layer 30, the hard coating layer 35 is laminated onto the front surface 24 of the base body 23 while being in close contact with the front surface 24.

The configuration, other than the above, is the same as the first embodiment. Thus, in the eighth embodiment, the same components as those in the first embodiment are given the same reference numerals, and detailed explanations are omitted.

Even if the decorative layer 28 is formed on part of the rear surface 25 of the base body 23, a portion (step) that is inclined with respect to the rear surface 25 of the base body 23 is formed at the boundary between the peripheral portion 28P of the decorative layer 28 and a portion of the coating layer 30 that covers the peripheral portion 28P. However, since the decorative layer 28 and the coating layer 30 are made of plastic materials having a difference in refractive index of less than or equal to 0.03, the near-infrared rays IR are unlikely to refract at the boundary between the decorative layer 28 and the coating layer 30 when passing through the step.

Thus, although the positions of the decorative layer 28 and the coating layer 30 in the cover body 21 are different from those in the first embodiment, the eighth embodiment has the following advantages, which correspond to the advantages of items (1-1) and (1-4). Since the difference from the first embodiment is only the positions of the decorative layer 28 and the coating layer 30, the eighth embodiment has the same advantages as the advantages of items (1-2), (1-3), and (1-5) of the first embodiment.

(8-1) In the eighth embodiment, in which the decorative layer 28 and the coating layer 30 are disposed between the base body 23 and the reflection suppression portion AR, the decorative layer 28 and the coating layer 30 are made of plastic materials chosen to have a difference in refractive index (0.03 or less). This suppresses the refraction of the near-infrared rays IR at the boundary (step) between the decorative layer 28 and the coating layer 30. The near-infrared sensor 12 can detect the position (angle) of the object outside the land vehicle 10 with high accuracy also by the near-infrared rays IR that have passed through the step, as in a case with near-infrared rays IR that have passed through portions different from the step.

(8-2) In the eighth embodiment, the decorative layer 28 protrudes rearward from the base body 23. With the decorative layer 28 covered, the coating layer 30 is laminated onto the base body 23 from the rear side. Thus, the appearance of the decorative layer 28 when the near-infrared transmissive cover 20 is viewed from the front of the land vehicle 10 is different from that in the first embodiment. However, in the eighth embodiment, the decorative layer 28 decorates the near-infrared transmissive cover 20 in the same manner as the first embodiment. This improves the appearance of the near-infrared transmissive cover 20 and the surrounding portion.

Ninth Embodiment

A near-infrared sensor for a land vehicle according to a ninth embodiment of the present disclosure will now be described with reference to FIG. 15.

In the ninth embodiment, the cover 16 of the near-infrared sensor 12 is formed by a near-infrared transmissive cover 70. The near-infrared transmissive cover 70 includes a peripheral wall 71 and a plate-shaped cover body 21. The peripheral wall 71 is arranged in front of the case 13 and has an annular cross-sectional shape. The cover body 21 is formed at the front end of the peripheral wall 71. The term "annular" as used in this description may refer to any structure that forms a loop, which is a continuous shape with no ends, as well as a generally loop-shaped structure with a gap, such as a C-shape. "Annular" shapes include but are not limited to a circular shape, an elliptic shape, and a polygonal shape with sharp or rounded corners.

The near-infrared transmissive cover 70 is formed to have a size sufficient to close the opening at the front end of the case 13 of the near-infrared sensor 12. The near-infrared transmissive cover 70 covers the emitting unit 14 and the receiving unit 15 from the front.

Figure 15:
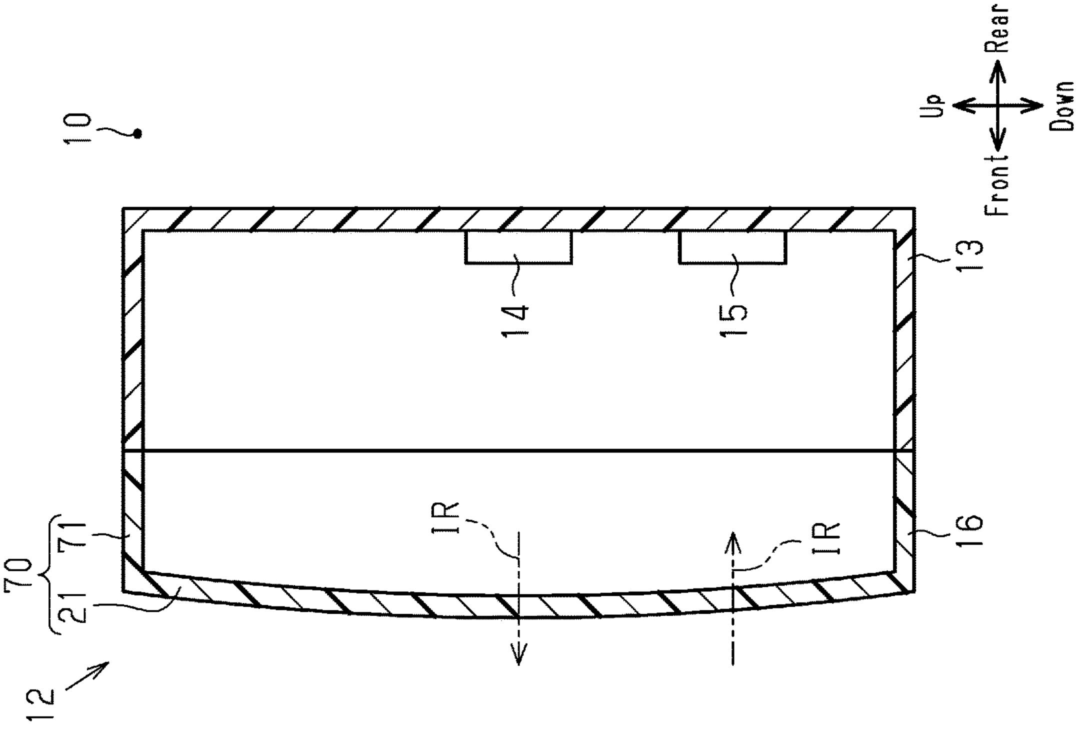
FIG. 15 is a cross-sectional view showing a near-infrared sensor according to a ninth embodiment.

Although the cover body 21 of the near-infrared transmissive cover 70 shown in FIG. 15 appears to be formed by a single layer, the cover body 21 has the same layer structure as the cover body 21 of the near-infrared transmissive cover 20 according to the first embodiment (see FIG. 2).

The configuration, other than the above, is the same as the first embodiment. Thus, in the ninth embodiment, the same components as those in the first embodiment are given the same reference numerals, and detailed explanations are omitted.

Thus, although the position of the cover body 21 differs from that in the first embodiment, the ninth embodiment shares a common feature with the first embodiment in that both have the emitting unit 14 and the receiving unit 15 covered from the front. The ninth embodiment thus has the same operation and advantages as the first embodiment.

Tenth Embodiment

A near-infrared sensor for a land vehicle according to a tenth embodiment of the present disclosure will now be described with reference to FIG. 16.

Figure 16:
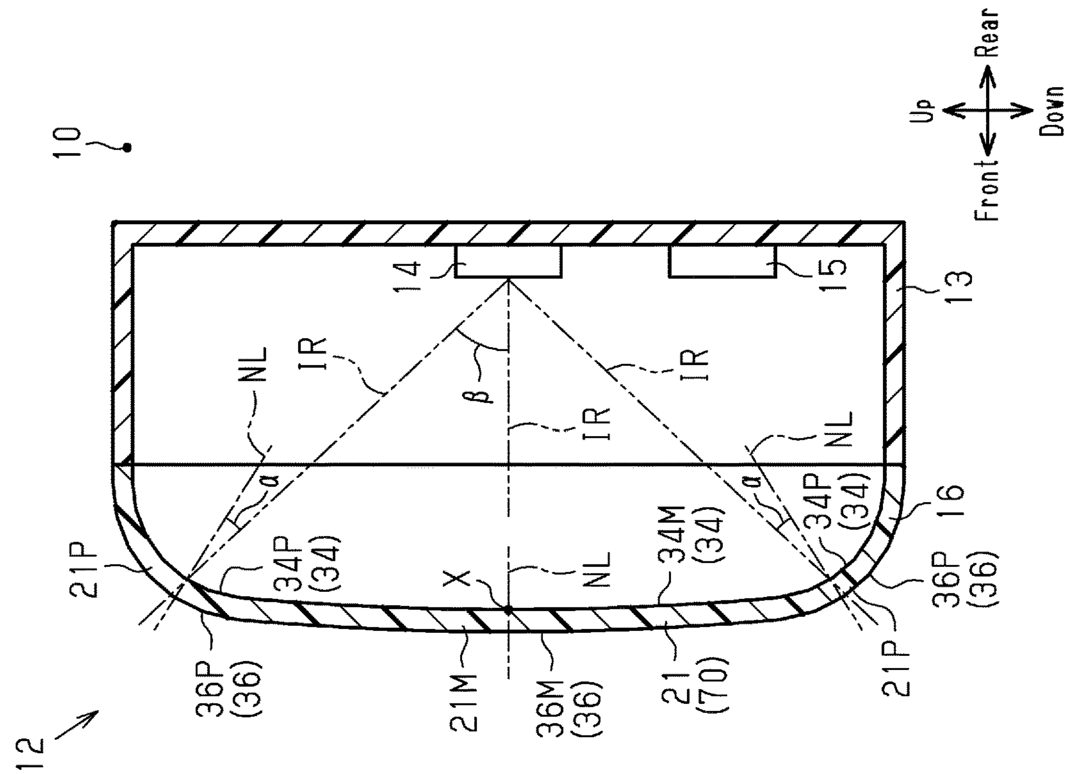
FIG. 16 is a cross-sectional view showing a near-infrared sensor according to a tenth embodiment.

Although a cover body 21 of a near-infrared sensor 12 shown in FIG. 16 appears to be formed by a single layer, the cover body 21 has the same layer structure as the cover body 21 of the near-infrared transmissive cover 20 according to the first embodiment (see FIG. 2).

In the tenth embodiment, a near-infrared transmissive cover 70 of the near-infrared sensor 12 includes the cover body 21, which is the same as the cover body 21 of the fifth embodiment. The cover body 21 includes an intermediate portion 21M and a peripheral portion 21P. The intermediate portion 21M includes a central irradiation section X. The peripheral portion 21P surrounds the intermediate portion 21M. The rear surface 34P of the peripheral portion 21P is located rearward of the rear surface 34M of the intermediate portion 21M. The rear surface 34P is curved to bulge forward and to be located rearward as the rear surface 34P extends away from the intermediate portion 21M. In FIG. 16, the same reference numerals are given to the elements that are the same as those in FIG. 11. Thus, the cover body 21 of the tenth embodiment operates in the same manner as the cover body 21 according to the fifth embodiment.

When the near-infrared rays IR are emitted in the central emission direction, the near-infrared rays IR are radiated to the central irradiation section X of the rear surface 34M of the intermediate portion 21M. The normal NL at the central irradiation section X extends in the central emission direction. Thus, in the central irradiation section X, the angle of incidence $\alpha$ of the near-infrared rays IR is small, and the amount of the reflected near-infrared rays IR is small.

As the section on the rear surface 34 of the cover body 21 that is irradiated with the near-infrared rays IR is shifted away from the central irradiation section X, an angle $\beta$ formed by the emission direction of the near-infrared rays IR and the central emission direction increases.

However, in the tenth embodiment, the rear surface 34P of the peripheral portion 21P is curved to bulge forward at a position rearward of the rear surface 34M of the intermediate portion 21M. Thus, at any position on the rear surface 34P, the normal NL extends in the emission direction. The angle of incidence $\alpha$ of the near-infrared rays IR is small at any position on the rear surface 34P.

Thus, the cover body 21 of the near-infrared sensor 12 according to the tenth embodiment achieves the same advantages as the cover body 21 of the near-infrared transmissive cover 20 according to the fifth embodiment.

Eleventh Embodiment

A sensor module according to an eleventh embodiment of the present disclosure will now be described with reference to FIG. 17.

Figure 17:
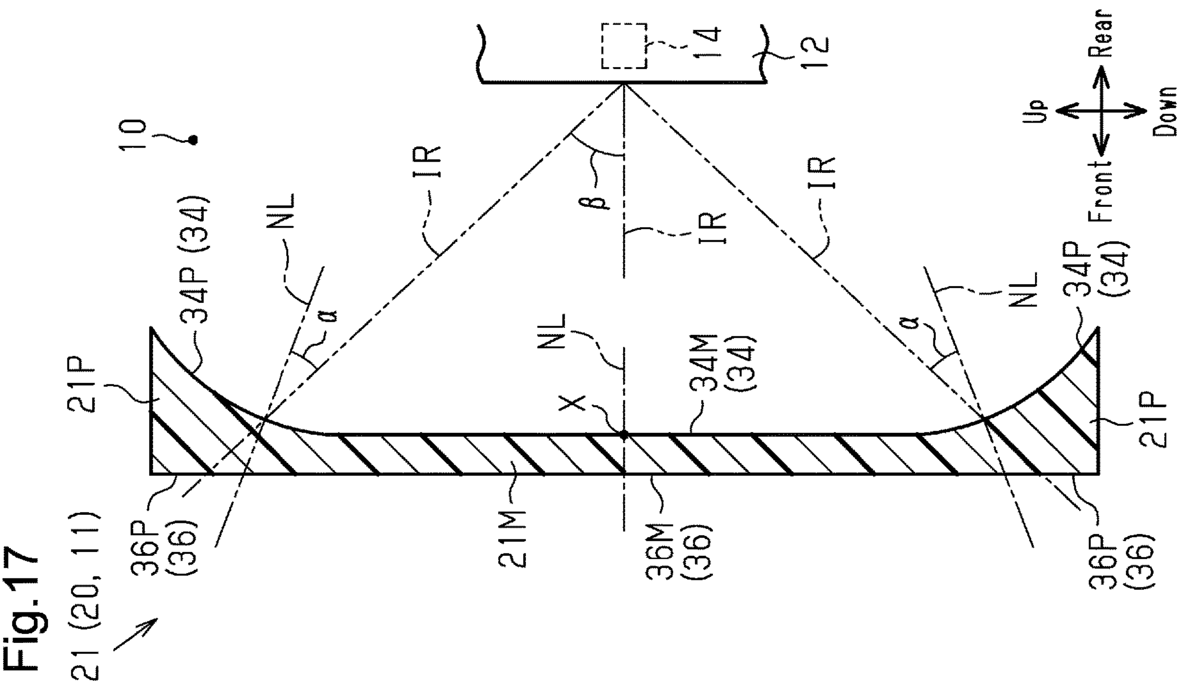
FIG. 17 is a cross-sectional view showing a cover body in a near-infrared transmissive cover according to an eleventh embodiment.

Although a cover body 21 shown in FIG. 17 appears to be formed by a single layer, the cover body 21 has the same layer structure as the cover body 21 of the near-infrared transmissive cover 20 according to the first embodiment (see FIG. 2).

In the fifth embodiment, the front surface 36P of the peripheral portion 21P is curved in the same manner as the rear surface 34P. In contrast, in the eleventh embodiment, the front surface 36P of the peripheral portion 21P is formed on a surface having an orientation different from that of the rear surface 34P.

FIG. 17 shows an example in which the front surface 36M of the intermediate portion 21M and the front surface 36P of the peripheral portion 21P are both flat. In this example, the rear surface 34M of the intermediate portion 21M is also flat. The front surface 36M and the rear surface 34M are parallel to each other. Thus, the intermediate portion 21M has a uniform thickness. In contrast, since the rear surface 34P of the peripheral portion 21P is curved, the thickness of the peripheral portion 21P gradually increases as the peripheral portion 21P extends away from the intermediate portion 21M.

The configuration, other than the above, is the same as the fifth embodiment. Thus, in the eleventh embodiment, the same components as those in the fifth embodiment are given the same reference numerals, and detailed explanations are omitted.

The eleventh embodiment differs from the fifth embodiment in the front surface 36P of the peripheral portion 21P. The rear surface 34P of the peripheral portion 21P is curved in the same manner as that in the fifth embodiment. The rear surface 34P is located rearward of the rear surface 34M of the intermediate portion 21M. The rear surface 34P is curved to bulge forward and to be located rearward as the rear surface 34P extends away from the intermediate portion 21M.

The eleventh embodiment thus achieves the same operation and advantages as the fifth embodiment.

The above-described embodiments may be modified as follows. The above-described embodiments and the following modifications can be combined as long as the combined modifications remain technically consistent with each other.

The cross-sectional shape of the protrusion 42 of the second embodiment may be changed from a right triangle to an isosceles triangle as in the third and fourth embodiments.

As the cross-sectional shape, an isosceles triangle is more preferable than a right triangle. The included angle between the two sides forming the vertex in the cross section can be set larger in an isosceles triangle than in a right triangle, which improves the productivity and makes the reflection suppression structures 41, 51 less prone to damages.

The protrusions 42 of the reflection suppression structure 41 according to the second embodiment may extend parallel with each other in the vertical direction while being adjacent to each other in the left-right direction (the vehicle width direction).

The decorative layer 28 according to the eighth embodiment may be formed by part of the base 22 like the decorative layer 26 according to the seventh embodiment.

The cover body 21 according to the tenth embodiment may have the same configuration as the cover body 21 of the near-infrared transmissive cover 20 according to the eleventh embodiment. That is, the front surface 36P of the peripheral portion 21P may be formed on a surface having an orientation different from that of the rear surface 34P. For example, the front surface 36P may be formed by a smooth surface together with the front surface 36M of the intermediate portion 21M. In this case, although the intermediate portion 21M has a uniform thickness, the thickness of the peripheral portion 21P gradually increases as the peripheral portion 21P extends away from the intermediate portion 21M.

The hard coating layer 35 according to the first to seventh embodiments and the ninth to eleventh embodiments may be formed by a hard coating film having a higher hardness than the coating layer 30.

The hard coating layer 35 according to the eighth embodiment may be formed by a hard coating film having a higher hardness than the base body 23.

The hard coating layer 35 according to each embodiment may be omitted. In addition, the cover body 21 may include an additional layer.

The components of the cover body 21, among the multiple combinations of adjacent elements, do not necessarily have to maintain a refractive index difference of 0.03 or less for combinations other than the one consisting of the decorative layers 26, 28, and the coating layer 30.

Other Modifications

The near-infrared transmissive cover 20, the near-infrared sensor 12, and the sensor module 11 may be installed in areas different from the front part of the land vehicle 10, such as the rear part. Alternatively, the near-infrared transmissive cover 20, the near-infrared sensor 12, and the sensor module 11 may be installed on both sides of either the front or rear part of the land vehicle 10, namely, on the diagonal front or diagonal rear sides.

When installed in the rear part of the land vehicle 10, the emitting unit 14 of the near-infrared sensor 12 emits the near-infrared rays IR rearward from the land vehicle 10. The near-infrared transmissive cover 20 is arranged in front of the transmitting unit 14 in the emission direction of the infrared rays IR, that is, behind the emitting unit 14 in the vehicle 10.

The near-infrared transmissive cover 20, the near-infrared sensor, 12 and the sensor module 11 may also be mounted on a vehicle of a type different from a land vehicle, for example, an electric train, an aircraft or a ship.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A near-infrared transmissive cover configured to cover an emitting unit and a receiving unit that are included in a near-infrared sensor from a front in an emission direction, the emitting unit being configured to transmit near-infrared rays to an outside of a vehicle while changing the emission direction within a predetermined angular range, and the receiving unit being configured to receive the near-infrared rays that have struck and been reflected by an object of the outside, the near-infrared transmissive cover comprising:

a cover body having transmissiveness to the near-infrared rays, wherein a framework of the cover body includes a base including a plate-shaped base body, the cover body includes:

the base body;

a decorative layer that protrudes forward or rearward in the emission direction from the base body;

a coating layer that is laminated onto the base body so as to cover the decorative layer; and a reflection suppression portion located at a rearmost part in the emission direction of the cover body, the reflection suppression portion suppressing reflection of the near-infrared rays emitted from the emitting unit, the decorative layer is formed by a part of the base or a member different from the base, the decorative layer and the coating layer are respectively made of plastic materials having a difference in refractive index of less than or equal to 0.03, the reflection suppression portion is formed by a first reflection suppression portion in a region of the cover body in which an angle of incidence of the near-infrared rays emitted from the emitting unit is less than 40°, and the reflection suppression portion is formed by a second reflection suppression portion in a region of the cover body in which the angle of incidence is greater than or equal to 40°, the second reflection suppression portion suppressing reflection of a greater amount of the near-infrared rays than the first reflection suppression portion does.

2. The near-infrared transmissive cover according to claim 1, wherein the cover body further includes:

an intermediate portion including a portion irradiated with the near-infrared rays when the emitting unit emits the near-infrared rays toward a central part of the angular range; and a peripheral portion surrounding the intermediate portion, a rear surface in the emission direction of the peripheral portion is located rearward of a rear surface of the intermediate portion, and the rear surface of the peripheral portion is curved to bulge forward in the emission direction and to be located rearward in the emission direction as the rear surface extends away from the intermediate portion.

3. The near-infrared transmissive cover according to claim 1, wherein all components of the cover body are respectively made of plastic materials having a difference in refractive index of less than or equal to 0.03 between each adjacent pair of the components.

4. A near-infrared sensor, comprising:

an emitting unit that is configured to transmit near-infrared rays to an outside of a vehicle while changing an emission direction within a predetermined angular range;

a receiving unit that is configured to receive the near-infrared rays that have struck and been reflected by an object of the outside;

a case including an open front end in the emission direction and that incorporates the emitting unit and the receiving unit; and a near-infrared transmissive cover that covers the emitting unit and the receiving unit from a front in the emission direction, wherein the near-infrared transmissive cover includes:

a peripheral wall that is arranged in front of the case in the emission direction and has an annular cross-sectional shape; and a cover body that is formed at a front end of the peripheral wall in the emission direction and has transmissiveness to the near-infrared rays, a framework of the cover body includes a base including a plate-shaped base body, the cover body includes:

the base body;

a decorative layer that protrudes forward or rearward in the emission direction from the base body;

a coating layer that is laminated onto the base body so as to cover the decorative layer; and a reflection suppression portion located at a rearmost part in the emission direction of the cover body, the reflection suppression portion suppressing reflection of the near-infrared rays emitted from the emitting unit, the decorative layer is formed by a part of the base or a member different from the base, the decorative layer and the coating layer are respectively made of plastic materials having a difference in refractive index of less than or equal to 0.03, the reflection suppression portion is formed by a first reflection suppression portion in a region of the cover body in which an angle of incidence of the near-infrared rays emitted from the emitting unit is less than 40°, and the reflection suppression portion is formed by a second reflection suppression portion in a region of the cover body in which the angle of incidence is greater than or equal to 40°, the second reflection suppression portion suppressing reflection of a greater amount of the near-infrared rays than the first reflection suppression portion does.

5. The near-infrared sensor according to claim 4, wherein the cover body further includes:

an intermediate portion including a portion irradiated with the near-infrared rays when the emitting unit emits the near-infrared rays toward a central part of the angular range; and a peripheral portion surrounding the intermediate portion, a rear surface in the emission direction of the peripheral portion is located rearward of a rear surface of the intermediate portion, and the rear surface of the peripheral portion is curved to bulge forward in the emission direction and to be located rearward in the emission direction as the rear surface extends away from the intermediate portion.

6. The near-infrared sensor according to claim 4, wherein all components of the cover body are respectively made of plastic materials having a difference in refractive index of less than or equal to 0.03 between each adjacent pair of the components.

* * * * *